Dec. 14, 1954  G. BOULARD  2,696,791
EQUIPMENT FOR THE LAYING AHEAD OF RAILROAD TRACKS
BY MEANS OF COMPLETELY ASSEMBLED SECTIONS
Filed Aug. 10, 1950  7 Sheets-Sheet 1
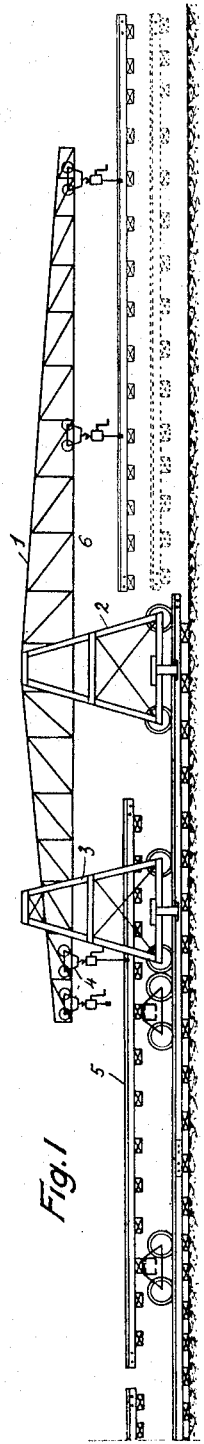
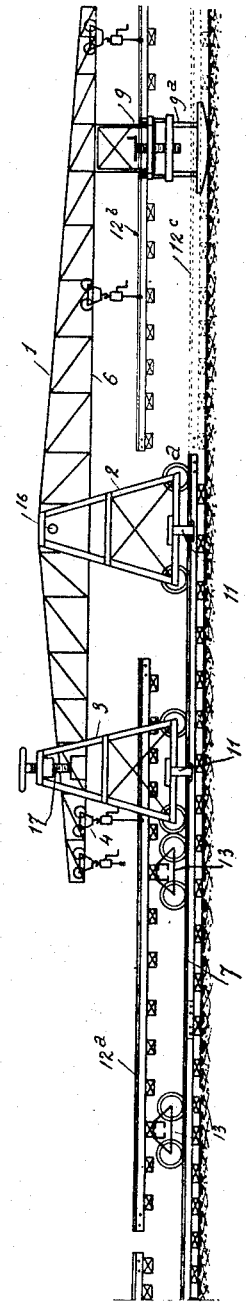
INVENTOR.
Georges Boulard
By Linton + Linton
Attorneys.

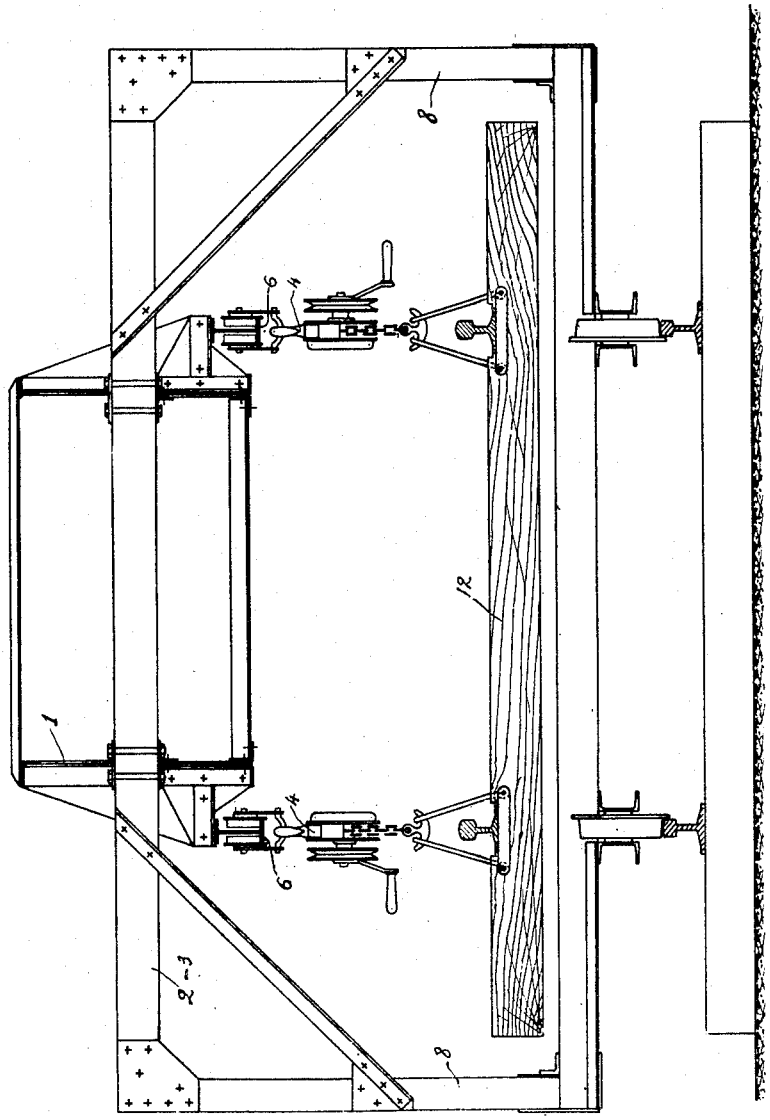

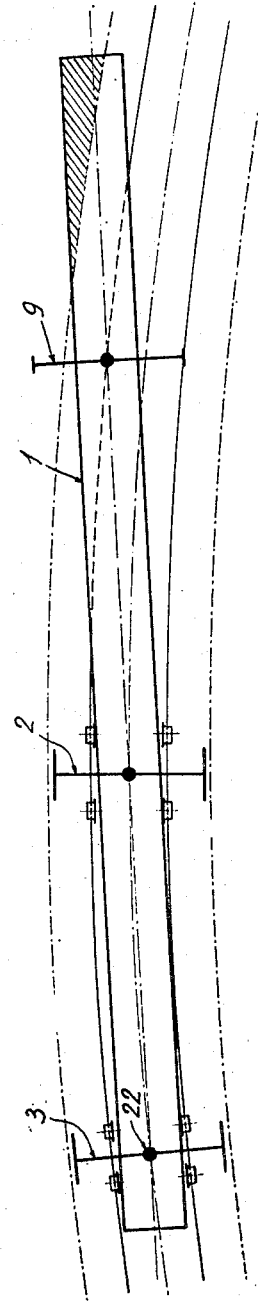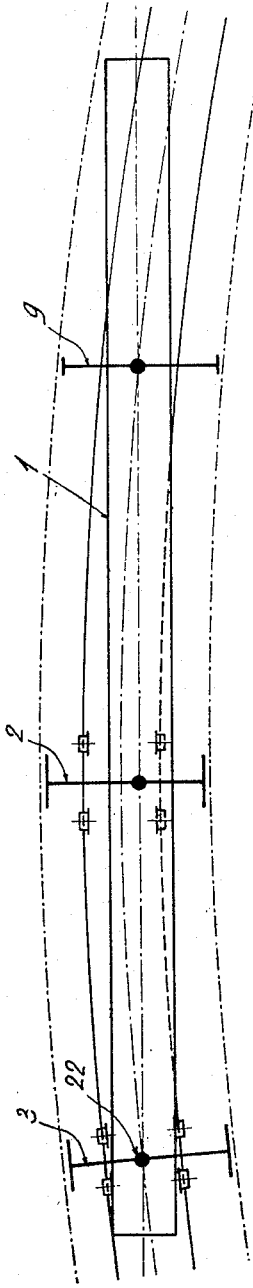

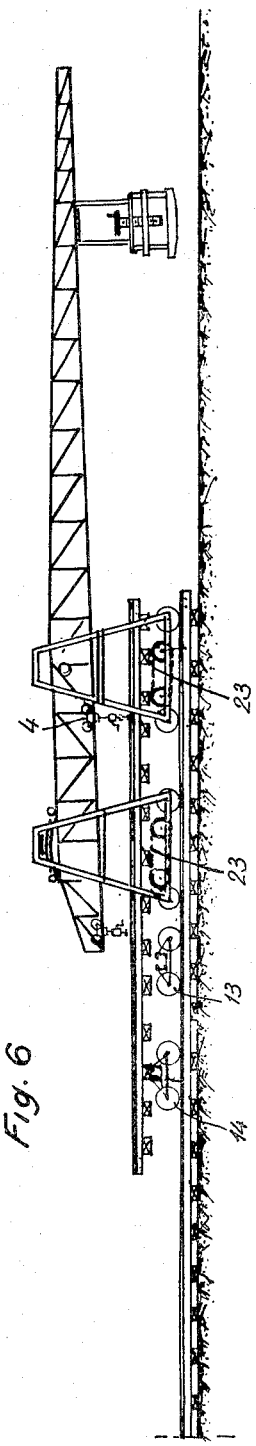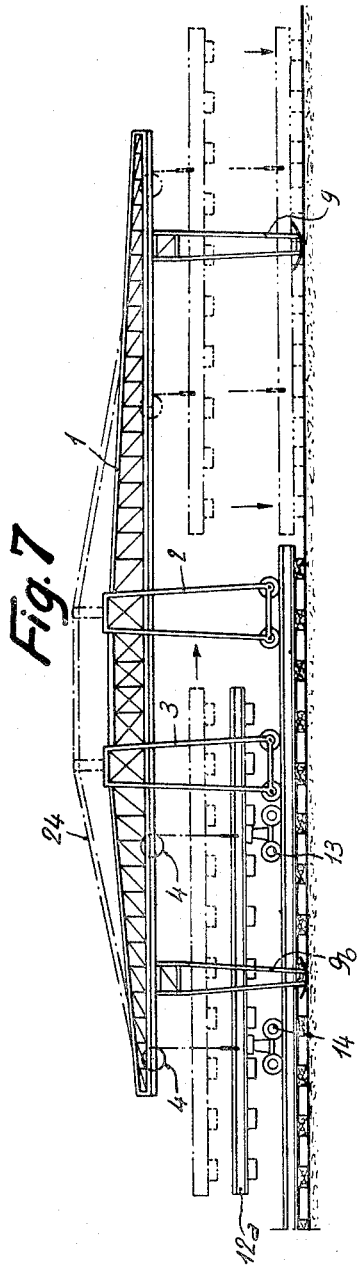

Dec. 14, 1954  G. BOULARD  2,696,791
EQUIPMENT FOR THE LAYING AHEAD OF RAILROAD TRACKS
BY MEANS OF COMPLETELY ASSEMBLED SECTIONS
Filed Aug. 10, 1950  7 Sheets-Sheet 5
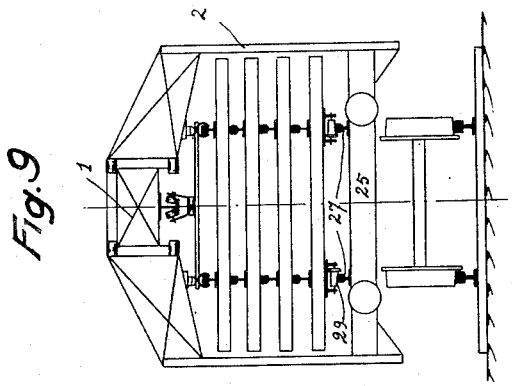
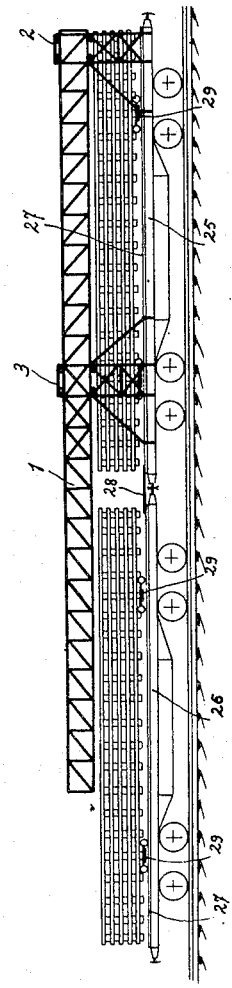
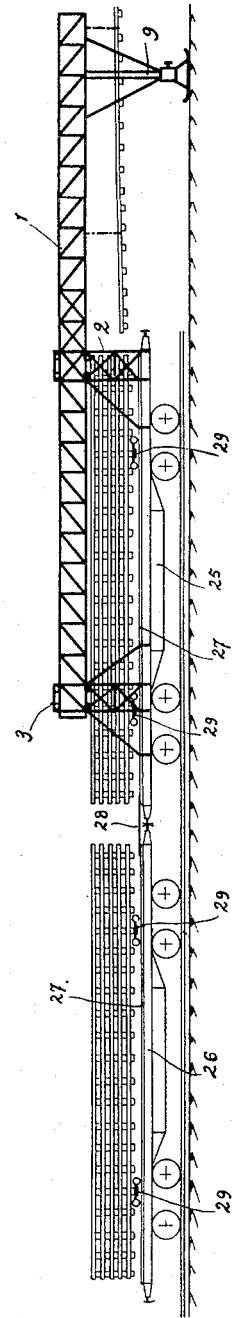
INVENTOR.
Georges Boulard
By Lutin & Lutin
Attorneys.

INVENTOR.
Georges Boulard.

Dec. 14, 1954  G. BOULARD  2,696,791
EQUIPMENT FOR THE LAYING AHEAD OF RAILROAD TRACKS
BY MEANS OF COMPLETELY ASSEMBLED SECTIONS
Filed Aug. 10, 1950  7 Sheets-Sheet 7
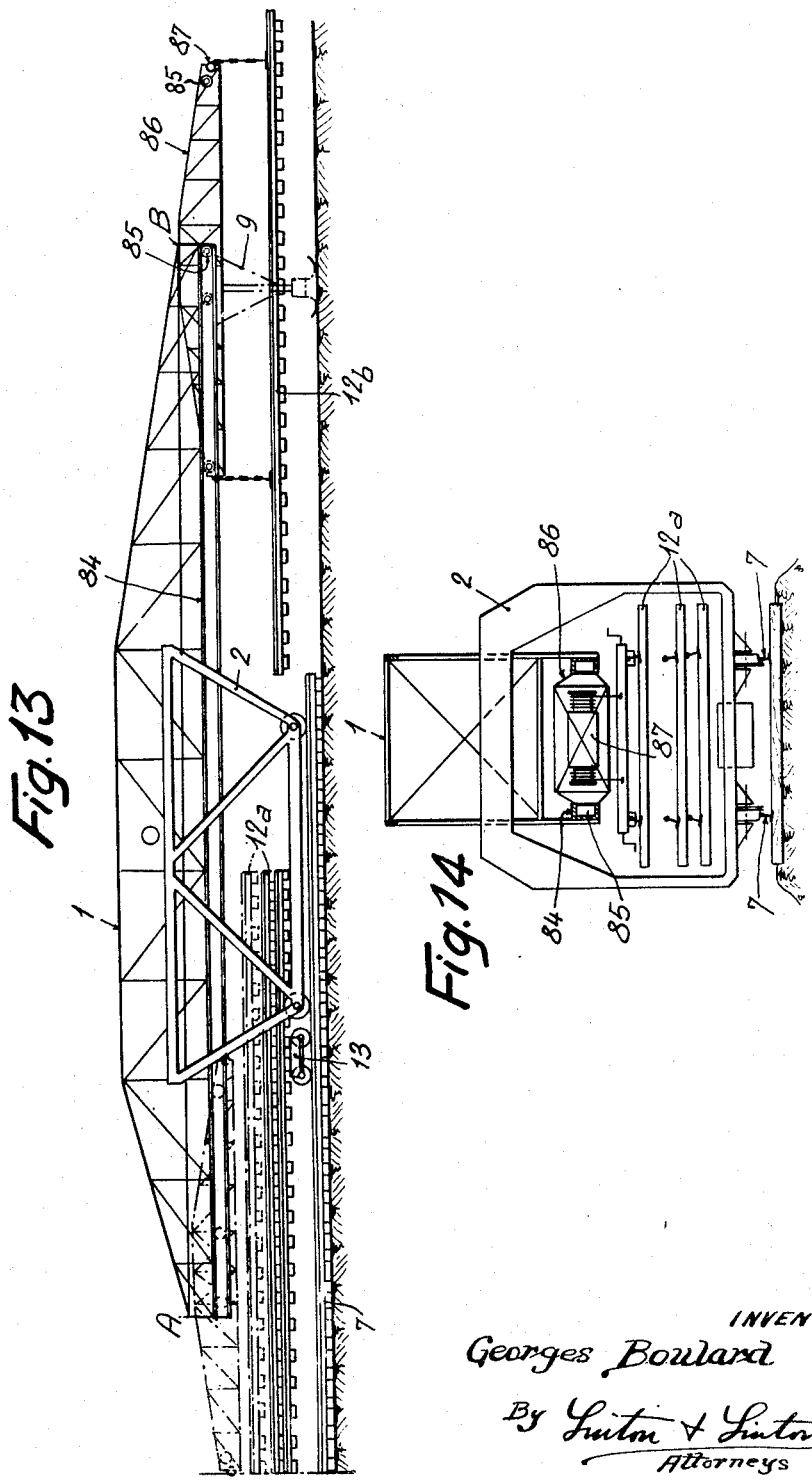
INVENTOR.
Georges Boulard
By Linton & Linton
Attorneys

2,696,791

EQUIPMENT FOR THE LAYING AHEAD OF RAILROAD TRACKS BY MEANS OF COMPLETELY ASSEMBLED SECTIONS

Georges Boulard, Neuilly-sur-Seine, France

Application August 10, 1950, Serial No. 178,736

3 Claims. (Cl. 104—3)

Several methods have been put forward for the laying ahead of a railroad by means of completely assembled sections, and as far as may be seen the easiest way to do this would be to make use of a suspended girder overhanging the spot where the railway line is to be laid; this girder is used to carry a roller-track along which the railroad section to be laid could be carried by means of pulley-blocks attached to trolleys and brought over the spot where it is to be put permanently in position; the section could then be lowered and joined by fish-plates to the previously laid section.

Figure 1 of the attached drawings shows in a diagrammatic way how such a method may be put into practice.

The girder 1, in this figure, is carried by two gantries 2—3 of which the bases grasp the rail to be laid 5. The girder is suspended over the spot where this section of rail 5 is to be laid. The rail section to be laid is brought below the rear portion of this girder 1 on trolleys that run on the rail sections already laid, and it is hooked to pulley-block carrying trolleys 4 that run on a roller-way 6 carried by this girder. The rail section to be laid is thus brought above the spot where it has to be placed (fine lines) and it is lowered to this spot (dotted lines), after which the job starts over again for a new length of rail laid further along.

Trouble is experienced with this method on account of the great length of rails of which use is made at the present time (18 and 24 metres, say 59 and 78.7 feet) that involves the employment of a girder of such a size and strength that the accompanying plants have to be bigger, heavier and more expensive and there are not many opportunities of being able to put such plants to practical use.

My invention deals with an improved method aiming at a lighter inexpensive layout, that may be used in a practical way under any conditions likely to be met with in usual practice.

The method given in my invention is provided always with a girder carried towards its rear end by bearers fastened either to light gantries running on the already laid line, or to a truck, with the girder held up in the front when it is under load by a pedestal that bears on the ground through two vertical standards.

This invention is illustrated, as an example, by the other figures of the accompanying drawings in which:

Figure 2 is a diagrammatic view in side elevation of the assembly of the equipment of which use is made for putting this method into practice;

Figure 3 is a cross-sectional view on a larger scale of one of the gantries carrying the rail section to be laid;

Figures 4 and 5 are diagrams showing the positions taken by the girder on a curved section of the track;

Figure 6 shows the use of endless conveyors to avoid having to carry back the pulley-blocks right to the rear end of the girder;

Figure 7 is an elevational view of an equipment furnished with an extra carrier towards the rear end;

Figure 8 is an elevational view of a device fastened on truck in working position;

Figure 9 is a corresponding end view on a larger scale;

Figure 10 is a diagrammatic elevational view showing the equipment drawn back for conveyance elsewhere;

Figures 13 and 14 are respectively a side view and a vertical cross section of a girder which may be extended by a small auxiliary movable girder acting as a telescopical extension of the main girder.

Figure 12:
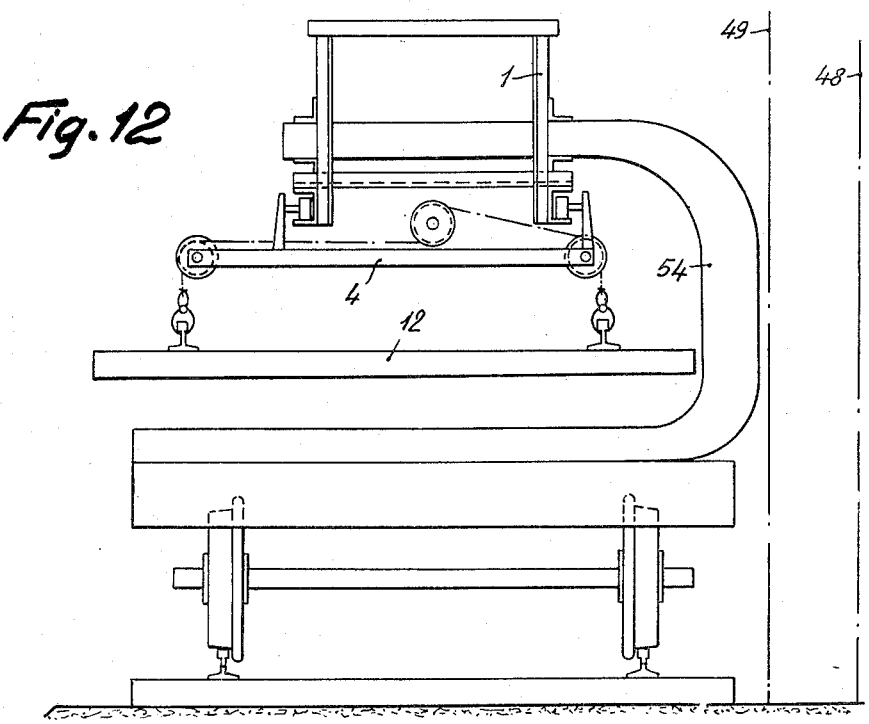
Figure 12 is a similar diagrammatic view of a rear carrier with a single side standard.

According to my invention (Figures 2 and 3) the laying outfit is formed mainly by a girder 1 that may be moved along the line already laid 7, for instance by means of two gantries 2—3 that are formed by a light frame of which the vertical standards 8 are so spaced that a sleeper for the standard gauge may be allowed to go between them, while offering no interference with the gauge of the rolling stock.

This girder 1 carries two roller-ways 6 on which may run pulley-block trolleys 4, to lift the fully assembled rail sections that are hooked on to them.

This girder 1, instead of overhanging above the roadbed as in the arrangement shown in Figure 1, is furnished with a forward support 9 that rests on the roadbed and of which the two uprights are wide enough apart to let the railway sleepers go through.

The invention therefore replaces an overhanging girder such as used in standard practice with a girder resting on two supports and so makes a much lighter job for an equal load.

This laying equipment is put into use in the following way. With the track assumed as previously laid up to the point $a$ (Figure 2), the forward gantry 2 carrying the girder 1 is drawn close to the end $a$ of the already laid track 7 and both gantries 2—3 are fastened to this already laid rail section by clamps 11; the rail section to be laid 12 is then brought on push-cars 13 to the position 12$a$, then it is gripped by the claws of the pulley-blocks 4 and is rolled along hanging from the pulley-blocks 4 until it is brought to the position 12$b$, then it is lowered to the road-bed at 12$c$ and joined by fish-plates to the previous rail section. Then the whole outfit is brought forward along a rail section and the work is all set as before for repeating the same operation.

To do this, the clamps 11 are loosened beforehand, and the lower ends of the vertical standards of the forward bearer 9 are removed from the ground so that the girder-gantry assembly is run forward without any interference.

For this purpose, various methods may be considered:

(1) The standards of the bearer 9 may be furnished with telescopic systems similar to rack type or screw type of jack, such as that shown in quite a diagrammatic way at 9$a$.

(2) Provision could be made at 16 of a hinged connection between the girder 1 and the front gantry 2 and action might be taken on the girder to raise the front part, either with a set of screw-type jacks at 17, or by any other means.

(3) Instead of raising the front portion of the girder, the base 9 could be furnished with wide rimmed wheels, with pneumatic tyres or Caterpillars, so as to enable it to change its position on the ground surface without having to be raised. It would then be necessary to have a hinged arrangement set at 16, in anticipation of any unevenness in the ground level, and to take into account the fact that the pull required to bring forward the whole layout would amount to a fairly high figure.

The front carrier 9 is provided, as previously remarked, with two base pieces bearing on the road-bed, with these base pieces spread wide enough apart so that the sleepers for the rail section to be laid may go between them. Accordingly the outer portion of the base pieces is close to the sleeper gauge. When use is made of this equipment on a curve, if no care was exercised, on the one hand one of the base pieces would stick out from the gauge, as shown diagrammatically in Figure 4, where the girder and the rails of the track are shown in full lines while the axis of the line and the outside boundaries of the gauge in broken line, on the other hand the rail section would be laid always from the outer side of the curve and it would be consequently requisite to line it in for its permanent position.

For the avoidance of this drawback, the girder is built so that it may swing round a vertical axis such as 22, in such a way as to have, in plan, the angular change of position (small besides) required for bringing (Figure 5) the front base pieces into a symmetrical position about the axis of the railway track. This swinging movement is effected either round a stud, or round any roller-way located on one of the gantries. Figure 4 shows the position that the girder would take up without this swinging movement, with its front end going outside the gauge (hatched area), while it is assumed in Figure 5 that the girder and the base pieces of its front carrier have been brought inside the gauge through being rotated round the vertical axis 22.

Furthermore the pulley-block carrying trolleys or the swivel-bar connecting them may have a swinging movement round a vertical axis.

In order not to have to extend the girder too far to the rear, the equipment may be provided with the improvement as shown in Figure 6. In this case, the equipment is supplied with travelling bands or rollers 23 that take the rail section to be laid and bring it forward. The rail section may be thus carried forward for quite a distance, instead of being pulled up when the first trolley on which it rests has come up against the rear gantry.

To make the operations as easy as possible for the handling and the laying of an assembled rail section, the rail section to be laid should be pushed forward as far as it can go under the girder. Use may be made for this purpose of the arrangement described above (Figure 6).

The girder might also (Figure 7) be extended far enough back so that both pulley-blocks 4—4, spaced apart from each other in the ordinary way, may grip and raise in one single operation the rail section to be laid 12. This extension to the rear of the girder 1 would involve quite a rearward movement of the whole thing. Use may be made, if considered requisite, of additional carriers 9b placed at the rear end as the extra supports 9 are employed at the front end, for cutting out any overhanging of the girder.

These additional supporting arrangements might be replaced by bracings 24 placed above the girder (shown in broken lines), but such an arrangement could not go far on account of the overall gauge of the fixed railway workings.

It may be intended to dismantle the equipment into separate parts that may be parked alongside the railway line, but it may be fitted so that it may be withdrawn from the line in one single piece or be conveyed to the nearest station yard by running it over the line.

It may be worthwhile in some cases to carry on with the assembly of the rail sections in a depot situated a long way from the place where they have to be laid and it would not be feasible in that case to bring the sections along by running them on lorries. The natural thing to do then would be to bring these trucks to the yard and to lay the rails directly by unloading of the trucks.

For this purpose the arrangement shown in Figures 8, 9 and 10 may be used. The assembly layout is provided always with the main item consisting of a girder 1 fastened to the truck by carriers 2—3 of which the uprights are spaced far enough apart to allow a transversely disposed sleeper to go between them, with this girder being relieved at the front end for working purposes by base supports 9 fastened to the girder and also spaced far enough apart to allow a sleeper to go through. With the rail sections loaded on the truck 25, use is made of the equipment in the same way as that explained above when dealing with a light portable equipment. The rail sections loaded on the truck 25 are laid one after the other by going forward by a rail length each time. When the truck 25 is empty, it is given another supply of rail sections, by transferring to it the load from other trucks 26. For this purpose, use may be made of already standardised methods; for instance there may be fitted up on the whole train of trucks a line 27 furnished with telescopic bridges 28 between each truck.

Each truck is loaded by means of special trolleys 29 running on the track 27. These trolleys are kept stationary in the ordinary course, but they may be unbolted and use may be made of them for transferring in one single unit the whole load of truck 26 on to the neighboring truck 25 that is assumed to be empty. In this way the truck 25 receives again its load of sections when it is emptied. It could be fed again, section by section, by making use of a trolley running on a line fastened to the trucks outside the overall length of the sleepers.

These methods however are given only as examples, any other suitable means may be used.

The various changes and improvements as disclosed above might be adopted also, in case of need and with the suitable fittings, to the equipment fastened on truck according to what is given in Figure 8.

The equipment that forms the object of the present disclosure may be used for taking up as well as laying of rails, with the operations merely reversed.

When this equipment has to be arranged for transfer elsewhere, to come to the depot or return to its siding, the girder 1 may be pushed back to the rear by running over rollers specially provided for this purpose in the supports 2—3 naturally after taking off the base pieces 9. It is then a simple matter to couple up to the truck 25 any type of railway carriage or other rolling stock.

In all the examples disclosed the rear supports like the front ones have to be sufficiently spread apart so that they may allow a sleeper to go between them. Now, it may happen that rail sections have to be laid or taken up with a length of sleeper out of the ordinary, or else of which the ends are unevenly distributed on each side of the central line of the track and so are distinctly outsize. The spacing then of the girder supports may not be enough to allow the sleepers to go freely at one and the same time between the uprights and keep within the overall gauge of the railway.

An accurate explanation will now be given of the methods that may be used to overcome these inconveniences.

(1) In the case of portable equipment that may be removed from the line and used accordingly on the actual working site, without running on the permanent track to reach the working job or return from it, all that has to be done from the structural standpoint is to provide wider equipment that keeps within the gauge on the side of the space between running tracks but projects slightly on the outer side where there is obviously no traffic to worry about.

(2) In the case where it is desired to keep the opportunity of running the equipment over the permanent way for going to the job and coming back from it, as well as in the case of equipment fastened on trucks, equipment may be built so that the vertical standards of the supports (front or rear, permanent or auxiliary) are in a fixed position, in regard to the loading gauge on the side of the space between running tracks, while on the other hand the standards on the outer side may be spread out or tightened up at will in the crosswise direction in order to keep within the gauge when on the move while showing in the working position a wide enough spacing.

Figure 11:
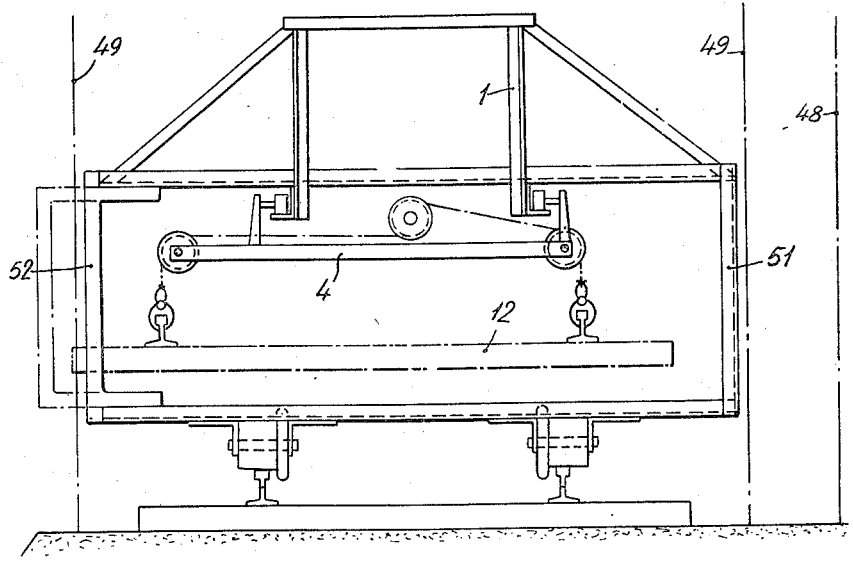
Figure 11 is a diagrammatic elevational cross section of a rear carrier of varying width.

This layout is shown in quite a diagrammatic way in Figure 11, where the righthand side standard 51 is seen as a fixture and the lefthand shiftable standard 52, in full lines when being transported, and in dotted lines for the working position. The vertical plane going through the axis of the space between running tracks is denoted at 48 and at 49 the limits of the loading gauge.

Another modified form of execution shown in Figure 12 would lie in the fact that the C-shaped gantries are provided only with a standard 54 on the side of the space between running tracks, with the outer side entirely free for allowing sleepers of unusual length to go through.

In one case as in another, the rail section would be laid on the ground in a position slightly offset from its permanent position, consequently it would have to be lined up a little.

The various descriptions given above have shown in a general way the rail sections to be laid brought in a single layer on lorries 13—14. It is quite clear that the equipment enables the laying to be done of rail sections brought in several layers on the trolleys which allows more closely packed loads, shorter lifts of trucks, less space taken up in the station yards.

In the same way the sections taken up may be loaded in several layers on trolleys that are made for them.

In the example illustrated in Figures 13 and 14 and intended to enable the girder used for the laying of track to be cut down to as short a length as possible, the girder is provided in its lower portion with roller-tracks 84 that constitute at the same time slides in which move the rollers 85 of a small movable girder 86 that carries hoisting gear 87 required for the handling of a rail section 12.

When the rail section at 12a has to be taken on lorries, the small movable girder 86 will be brought into its far end position shown in broken lines at the left portion of Figure 1, after lifting the rail section by means of the hoisting gear 87, the small girder is made to roll forward until it reaches a position when it goes beyond the front end of the main girder, such as shown in full lines, with the rail section arriving at 12b above where it is to be laid. All that has to be done then is to lower this section to the road-bed for carrying on with the laying of the track. When the rail section is properly laid, the travelling-gantry crane 2 and the girder 1 will be brought forward over the length of the section that has been laid and the operations may be started over again for the following section to be laid.

It will be observed that the roller-ways 84 constituting slides enable the small girder 86 to go ahead until it reaches a position where the centre of gravity of this small girder would go beyond the end of the girder 1.

Instead of being supported by rollers, the small girder 86 could be held up by slides or any other corresponding kind of arrangement.

When transferring the gear to another site, the girder 1 is cut down in length to the distance AB, which makes it much easier to handle, it is much better balanced and its inclusion inside the permanent-way gauge of the track makes it much easier to negotiate the curves of the railway along which it is travelling. If the length of the rails is short enough, the auxiliary standards 9, that have been shown in broken lines in Figure 13, may be cut out.

I declare that what I claim is:

1. A device for laying completely assembled sections of track ahead of laid track comprising a pair of gantries capable of rolling along on previously laid track and having side standards spaced apart for the passage of track sections therebetween, a girder pivotally connected at a medial point to said standards of one of said gantries and extending at its rear end portion through the other of said gantries, means connecting the rear end portion of said girder to the other of said gantries and permitting a limited movement therebetween, hoisting means for raising and carrying an assembled section of track slidably mounted on said girder for movement longitudinally thereof, a ground support carried by the forward end of said girder and adapted for resting on the ground to a side of the bed for the track section being laid, and means mounted on said second gantry for pivoting said girder and raising said ground support whereby the device may move over the length of the newly laid track section.

2. A device for laying completely assembled sections of track ahead of laid track comprising a pair of gantries capable of rolling along on previously laid track and having side standards spaced apart for the passage of track sections therebetween, a pair of endless conveyors each mounted across the lower portion of one of said gantries for slidably supporting track sections being moved forward, a girder connecting said gantries and extending forwardly thereof, hoisting means for raising and carrying an assembled section of track slidably mounted on said girder for movement longitudinally thereof, a ground support carried by the forward end portion of said girder and adapted for resting on the ground for supporting said girder and means for raising said ground support carried thereby.

3. A device for laying completely assembled sections of track ahead of laid track comprising a pair of gantries capable of rolling along on previously laid track and having side standards spaced apart for the passage of a track section therebetween, a girder extending through and from said gantries with a medial portion pivotally carried by one of said gantries, resilient means positioned between the tops of the rear end portion of said girder and the other of said gantries tending to raise the forward end of said girder, hoisting means for raising and carrying an assembled section of track slidably mounted on said girder for movement longitudinally thereof, and a ground support carried by the forward end portion of said girder and adapted for resting on the ground for supporting said girder.

References Cited in the file of this patent

UNITED STATES PATENTS

| Number | Name | Date |
|---|---|---|
| 397,577 | Anderson | Feb. 12, 1889 |
| 400,950 | Roberts et al. | Apr. 9, 1889 |
| 505,638 | Rasch | Sept. 26, 1893 |
| 1,368,289 | Post | Feb. 15, 1921 |
| 1,547,019 | Breitland | July 21, 1925 |
| 2,458,050 | Blondelle | Jan. 4, 1949 |

FOREIGN PATENTS

| Number | Country | Date |
|---|---|---|
| 632,935 | France | Apr. 16, 1927 |
| 503,481 | Germany | July 23, 1930 |
| 53,965 | Norway | May 28, 1934 |